(12) United States Patent
Stadtlander

(10) Patent No.: US 7,070,673 B2
(45) Date of Patent: Jul. 4, 2006

(54) METHOD FOR REPAIRING LOOSE MOLDED-IN BUSHINGS

(75) Inventor: Daniel M. Stadtlander, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 251 days.

(21) Appl. No.: 10/188,566

(22) Filed: Jul. 2, 2002

(65) Prior Publication Data

US 2004/0003889 A1    Jan. 8, 2004

(51) Int. Cl.
*B29C 65/54* (2006.01)

(52) U.S. Cl. .......................... 156/285; 156/91; 156/94; 156/286; 156/293

(58) Field of Classification Search .................. 156/87, 156/91, 94, 95, 98, 285, 286, 293, 92; 29/402.01, 29/402.02, 402.18; 264/36.1, 36.14, 36.22; 227/14; 16/2.1, 2.2; 403/365, 372; 277/305, 277/422; 428/120; 52/309.2, 309.16, 366, 52/787.1, 787.11, 787.12

See application file for complete search history.

(56) References Cited

U.S. PATENT DOCUMENTS

| 4,781,775 A | * | 11/1988 | Reed et al. ............... 156/89.12 |
| 4,812,193 A | * | 3/1989 | Gauron ....................... 156/293 |
| 5,240,543 A | * | 8/1993 | Fetterhoff et al. .......... 156/293 |
| 6,561,247 B1 | * | 5/2003 | Chou et al. ................. 156/382 |

* cited by examiner

*Primary Examiner*—Gladys J P Corcoran
(74) *Attorney, Agent, or Firm*—Bachman & LaPointe, P.C.

(57) ABSTRACT

The present invention relates to a method for bonding a component, such as a bushing, into a part, such as a panel. The method broadly comprises attaching a vacuum chamber to a surface of the part, seating the component into a slot in the part, and applying an adhesive material about a circumference of the component while drawing a vacuum in the vacuum chamber to allow the adhesive material to flow between the part and the component.

10 Claims, 1 Drawing Sheet

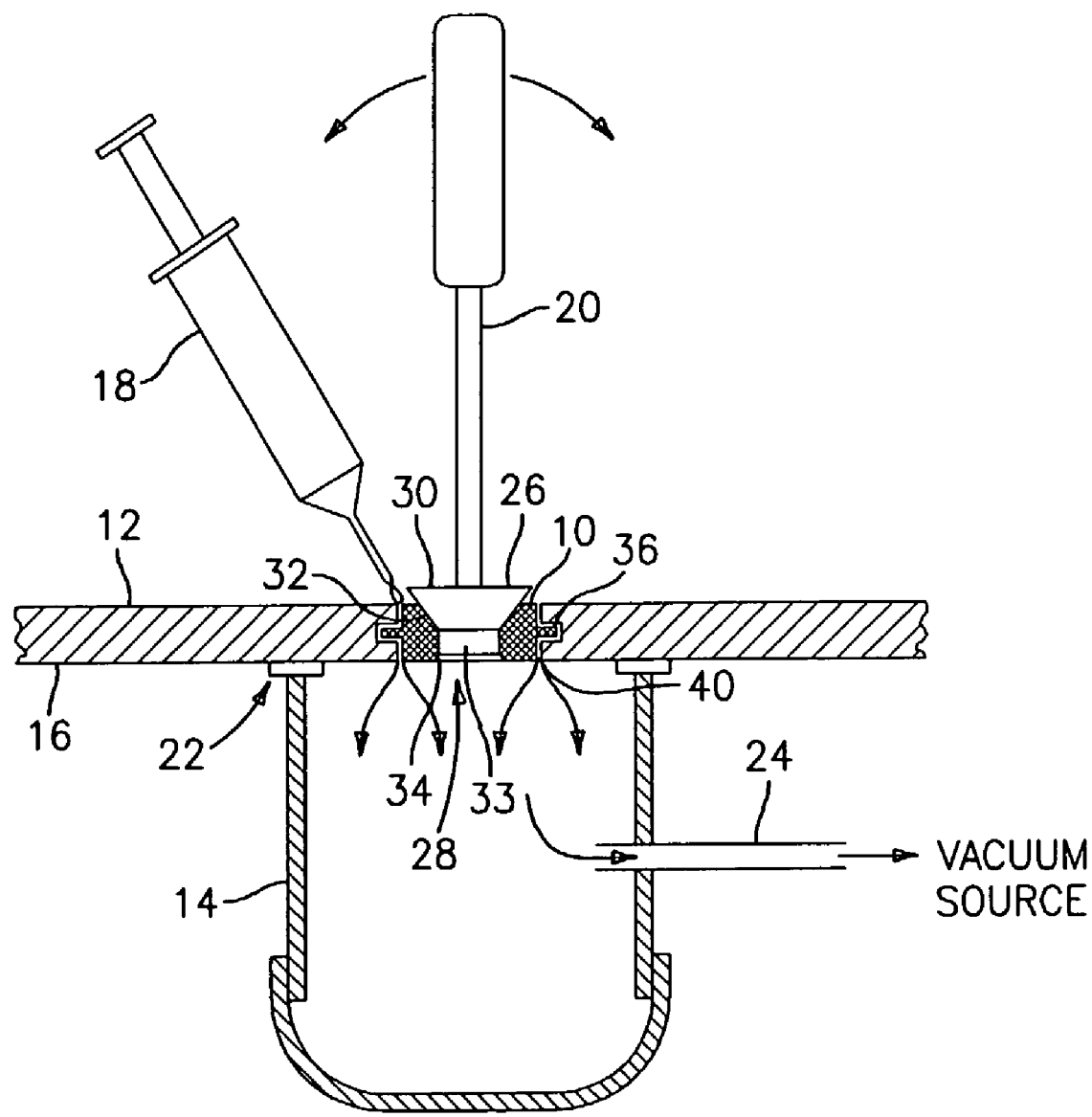

METHOD FOR REPAIRING LOOSE MOLDED-IN BUSHINGS

BACKGROUND OF THE INVENTION

The present invention relates to a method for re-bonding a component, such as a bushing, which is mechanically locked into a part, such as a panel.

Components, such as bushings, molded into a part, such as a composite panel, come loose as a result of wear and vibration during service and need to be re-bonded into position. Previous repair techniques for performing such re-bonding involve either a staking of the component or drilling injection holes. One of the great difficulties with these previous repair techniques is trying to get a proper flow of the adhesive material used to re-bond the component.

Thus, there remains a need for a repair technique which effectively re-bonds a loosened component into place.

SUMMARY OF THE INVENTION

Accordingly, it is an object of the present invention to provide a method for re-bonding a component into a part. It is a further object of the present invention to provide a method as above which obtains a proper flow of the adhesive material used to bond the component.

The foregoing objects are attained by the method of the present invention.

In accordance with the present invention, a method for re-bonding a component into a part is provided. The method broadly comprises attaching a vacuum chamber to a surface of the part and applying an adhesive material about a circumference of the component while drawing a vacuum in the vacuum chamber to allow the adhesive material to flow between the part and the component.

A system for performing the method of the present invention is also disclosed.

Other details of the method of the present invention, as well as other objects and advantages attendant thereto, are set forth in the following detailed description and the accompanying drawing wherein like reference numerals depict like elements.

BRIEF DESCRIPTION OF THE DRAWING

The FIGURE illustrates a system for bonding a component into a part.

DETAILED DESCRIPTION OF THE PREFERRED EMBODIMENT(S)

Referring now to the FIGURE, a system for re-bonding a component 10, such as a bushing, which is mechanically locked into an opening in a part 12, such as a panel, is illustrated. The system includes a vacuum chamber 14 secured to a surface 16 of the part 12, a means 18 for depositing an adhesive all around the circumference of the component 10 to be rebonded, and a manually operable tool 20 whose function will be described hereinafter.

The vacuum chamber 14 may be locally manufactured from a polyvinylchloride pipe with an end cap or from any other suitable vessel known in the art. The vacuum chamber may be secured to the surface 16 by any suitable means known in the art, such as by a sealant tape 22. The vacuum chamber 14 may be connected to a vacuum source (not shown) via a conduit 24.

The manually operable tool 20 is used for two purposes. One to seal the inside of the bushing against leakage and Two to rock the bushing to break the seal between the bushing flange 36 and the panel 12. As can be seen from the FIGURE, the tool 20 has an end portion 26 which conforms to the shape of an opening 28 in the component 10. For example, the end portion 26 may have a conical portion 30 for engaging conical surfaces 32 in the opening 28 and a cylindrical tip portion 33 for engaging a cylindrical portion 34 in the opening 28. As shown in the FIGURE, the tool 20 may be rocked from side to side to break any seal between the part 12 and a flange 36 which surrounds the component 10. This allows an adhesive material to better flow between the component 10 and the part 12. The tool 20 also serves to plug the opening 28 while a vacuum is being applied to the chamber 14.

The adhesive depositing means 18 may comprise any suitable means known in the art for applying an adhesive material between the component 10 and the part 12. Preferably, the adhesive depositing means 18 comprises a syringe.

The bonding method of the present invention may be performed by first cleaning the surface area around the component 10. Any suitable technique known in the art may be used to perform the cleaning step. Following cleaning, the component 10 and the part 12 are allowed to air dry. While the component 10 and the part 12 are drying, an adhesive system for securing the component 10 to the part 12 may be prepared. The adhesive system may be any suitable adhesive material known in the art such as a 2 part liquid epoxy resin. If desired, the mixed adhesive may be diluted with a suitable solvent to reduce viscosity. As previously mentioned, the vacuum chamber 14 may be locally manufactured and attached to the back side of the part 12 using a sealant material such as sealant tape 22. Once the vacuum chamber has been manufactured, the tool 20 may be used to plug the opening 28 in the component 10.

Thereafter, a vacuum may be drawn, typically 25 inches Hg minimum. While the vacuum is drawn, the mixed adhesive material is injected into the gap 40 around the component 10. The adhesive material is injected until it starts to appear out of the back side of the part 12. Then, the vacuum source and the plug tool 20 are removed and the adhesive material is allowed to cure per the adhesive manufacturer's recommended cure time and temperature. One of the advantages to the method of the present invention is that the adhesive material may be applied more completely around the component 10 to be bonded into the part 12 as a result of the vacuum application. Further, the method of the present invention is easy to perform and does not require expensive equipment.

The method of the present invention has particular utility in re-bonding of bushings that are mechanically locked in place at the time of original manufacture and become loose during usage. Typical usage of this invention would include repairing front and rear liner panels of turbine engines, where the mounting bushings have become loose due to cyclical temperature variations and vibration.

It is apparent that there has been provided in accordance with the present invention a method for repairing loose molded-in bushings which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A method for bonding a component into a part comprising the steps of:
    attaching a vacuum chamber to a first surface of said part where said component is seated in an opening in said part; and
    applying an adhesive material about a circumference of said component along a second surface of said part opposed to said first surface while drawing a vacuum in said vacuum chamber to allow said adhesive material to flow between the part and the component.

2. A method according to claim 1, further comprising cleaning a surface area around said component and allowing said surface area to dry.

3. A method according to claim 1, wherein said adhesive material applying step comprises applying an epoxy containing adhesive material.

4. A method according to claim 3, further comprising diluting said epoxy containing material with a solvent prior to said applying step.

5. A method according to claim 1, further comprising locally fabricating said vacuum chamber from a pipe having an end cap and said attaching step comprising affixing said locally fabricated vacuum chamber to said part surface using a sealant material.

6. A method according to claim 1, wherein said vacuum drawing step comprises drawing a 25 inch Hg minimum vacuum.

7. A method according to claim 1, wherein said adhesive material applying step comprises applying said adhesive material using a syringe into a gap around said component and continuing to apply said adhesive material until adhesive material starts to appear out a back side of the component.

8. A method according to claim 7, further comprising plugging a hole in said component with a plug tool while said vacuum is applied, discontinuing said vacuum, removing said plug tool after said vacuum is discontinued, and curing said adhesive material.

9. A method according to claim 7, further comprising placing a plug tool into a hole in said component and rocking said component back and forth with said plug tool to break a seal between the part and the component to allow said adhesive material to flow.

10. A method for bonding a bushing into a panel comprising the steps of:
    attaching a vacuum chamber to a first surface of said panel were said bushing is seated in an opening in said panel; and
    applying an adhesive material about a circumference of said bushing along a second surface of said panel opposed to said first surface while drawing a vacuum in said vacuum chamber to allow said adhesive material to flow between the panel and the bushing.

* * * * *